United States Patent [19]

Rooke et al.

[11] 3,717,270
[45] Feb. 20, 1973

[54] CONTAINER UNLOADING

[75] Inventors: Sydney William Rooke, Ronald Frances Coston, both of Erith, Kent, England

[73] Assignee: Sonex Ltd., Kent, England

[22] Filed: Nov. 17, 1971

[21] Appl. No.: 199,568

Related U.S. Application Data

[63] Continuation-in-part of Ser. No. 11,956, Feb. 17, 1970, Pat. No. 3,651,967.

[52] U.S. Cl..................214/307, 198/37, 214/52 R, 214/314
[51] Int. Cl. ..............................B65b 21/02
[58] Field of Search ......214/8.5 A, 16.4 R, 306, 307, 214/314, 52 R; 221/91; 198/37

[56] References Cited

UNITED STATES PATENTS

| 3,200,969 | 8/1965 | Madden | 214/6 |
| 3,315,785 | 4/1967 | Shiffer | 198/85 |
| 378,945 | 3/1888 | Alexander-Katz | 194/2 |
| 2,727,641 | 12/1955 | Tomkins | 140/149 |
| 1,853,392 | 4/1932 | Zesbaugh | 198/110 |

*Primary Examiner*—Robert G. Sheridan
*Assistant Examiner*—Lawrence J. Oresky
*Attorney*—Elliot I. Pollock et al.

[57] ABSTRACT

An apparatus for unloading the contents of containers, particularly but not exclusively baggage or cargo containers used in aircraft. The apparatus comprises a decanter apparatus for tilting each container toward an open side thereof at a discharge station and a fence arranged to hold back the contents of at least one region of said container until the contents of at least one other region have been discharged as a result of the tilting, the fence being arranged for relative vertical movement with respect to said open side to permit controlled discharge of the regions of said container in a predetermined order. The loaded containers are placed in turn on the decanter apparatus in the upright position and then tilted towards an open side of the container, the fence being arranged initially to close the open side except for the upper part thereof, and the fence is then moved with respect to the container side thus permitting progressive discharge of the container. Means are provided which are actuated by discharged articles to control the speed of the conveyor and so regulate the rate at which articles leave the conveyor and means may also be provided which control the relative movement of the fence with respect to the container side in synchronism with the speed of the conveyor.

11 Claims, 15 Drawing Figures

CONTAINER UNLOADING

RELATED application.

This application is a continuation-in-part of Ser. No. 11,956 filed Feb. 17, 1970 and patented Mar. 28, 1972 as U.S. Pat. No. 3,651,967

This invention concerns improvements relating to the unloading of containers, particularly but not exclusively baggage or cargo containers used in aircraft in which difficulty has been experienced due to the sudden delivery of the contents of a container, this invention being concerned with controlling the speed of discharge to prevent this occurrence and improve delivery.

According to our co-pending invention, Ser. No. 11956 filed Feb. 19, 1970, now U.S. Pat. No. 3,651,967 there is provided an apparatus for unloading the contents of containers, comprising a decanter apparatus for tilting each container towards an open side thereof at a discharge station and a fence arranged to hold back the contents of at least one region of said container until the contents of at least one other region have been discharged as a result of the tilting, the fence being arranged for relative movement with respect to said open side to permit discharge of the regions of said container in a predetermined order. Advantageously, in that invention a conveyor onto which the said contents are thus discharged is arranged to be lowered in conjunction with the said fence and with a chute projecting from and aligned with the upper edge of the fence.

This invention is concerned with the apparatus of our earlier application No. 11956, now U.S. Pat. No. 3,651,976 and relates to a further development of the apparatus in which means are provided by which the speed of the discharge conveyor is regulated to control the rate of flow of the articles. These speed regulating means may also be used to vary the rate at which the relative movement of the fence with respect to the container side is effected.

In a first embodiment of the invention, the containers are placed in turn on the decanter apparatus in the upright position and then tilted towards an open side of the container against a fence which is arranged initially to close the open side except for the upper part thereof, and is then poved downwardly towards the container base thus permitting progressive discharge of the container, the contents being delivered to a chute attached to the fence and which directs the container contents to suitable delivery means. The empty container is then returned to the upright condition and discharged from the decanter.

In a second embodiment of the invention, the fence and chute form a part of the decanter apparatus and are tilted into the discharge attitude with the container, which is then moved upwards past the fence, by which movement discharge of the container contents is controlled. The empty container is then lowered and returned to the upright position for subsequent discharge from the decanter.

In a third embodiment of the invention, the fence forms a part of the decanter and is swung, with the container, into the tilted position and into alignment with the chute, the container then being elevated in the tilted position as in the previous embodiment. Means may also be provided which as well as tilting the container towards the open side, are arranged to tilt the container towards one end; this permits unloading successive regions of the container under greater control particularly where the container is divided into a number of regions by columns or by partitions which do not have smooth surfaces.

The containers may be divided horizontally into two or more compartments, and they may be further divided by a vertical partition into two sets of compartments or parts back to back, them similar provision may be made for the tilting of each container first towards one open side and then towards the other open side, such provision including in each case a fence operating in the manner set forth above.

In an alternative arrangement the fence may be arranged to move bodily with respect to the container from below upwards.

The speed of the discharge conveyor is controllable for example, by means of a light ray which is interrupted by articles travelling from the chute to the delivery point in order to establish a maximum rate of flow which may be for example 30 articles per minute.

The speed of the empty conveyor is initially near its maximum, and when the light beam is interrupted by the first article, such as a mail bag a time delay is activated and the conveyor is slowed until both the light beam is freed and the time delay has expired at which time the conveyor will accelerate to its full speed. Thus unless both the beam is made and the time delay has expired, the conveyor will run at its slower speed, so slowing down the rate at which articles are taken from the decanter and fed to the delivery point. Typically the time delay is 1 or 2 seconds. The light beam is located across the conveyor at the appropriate height to be interrupted by the articles which may be mail bags, and spaced approximately the length of one article from the output end of the conveyor.

In a further embodiment of the invention, the movement of the fence with respect to the side of the container is either stopped completely or decelerated when the light beam is interrupted. As soon as the light beam is re-made and the time delay has expired the movement of the fence is re-started or accelerated to its desired speed to effect the controlled unloading of the container.

It is particularly advantageous if the upper edge of the fence is higher at one end than the other, thus giving greater graduation of the unloading process, the edge of the fence being either continuously straight or curved, or being formed as a series of steps to achieve the same purpose.

In a modified embodiment of the invention, the fence may consist of an undriven conveyor belt, supported on rollers carried in sliding guides and one flight of which has a surface area equal to that of the side of the container and which thus in one position covers the while container side. In operation, the two rollers are moved bodily together across the container side, progressively uncovering this part of the container, until the belt has been fully moved to one side exposing the whole container side and permitting it to be completely emptied. Such an arrangement eliminates any possibility of wear or damage to articles in the container caused by drag or friction due to contact with the fence.

The invention permits of expeditious discharge of, say, passengers' luggage from such containers by simple means and of the forwarding of such luggage to a distributing, sorting or collection point or points with a minimum of difficulty.

Embodiments of the invention will now be more fully described by way of example and with reference to the accompanying drawings, in which.

In the following description, it will be assumed in each instance that the container is sub-divided horizontally by two shelves into three compartments. It will be apparent that further sub-division or combinations thereof are possible within the scope of the invention.

Referring firstly to FIGS. 1 to 5, the loaded containers C are fed, from for example an aircraft, to a conveyor 1 and delivered in turn to a decanter apparatus. In this embodiment the conveyor comprises a powered indexing chain conveyor with drive dogs 2, the containers being supported on wheeled trolleys 3, the drive dogs 2 being spring loaded to allow each container and its trolley 3 to be pushed into position in the decanter apparatus 4.

The decanter comprises an outwardly tiltable cradle base 5 carried on rockable arms 6, the tilting of the cradle about the bearings 7 being by means of hydraulic or pneumatic jacks 8, each trolley 3 being located on the cradle 5 by wheel support pads held in the feed position by fixed blocks or other suitable means such as clamps.

Figure 3:
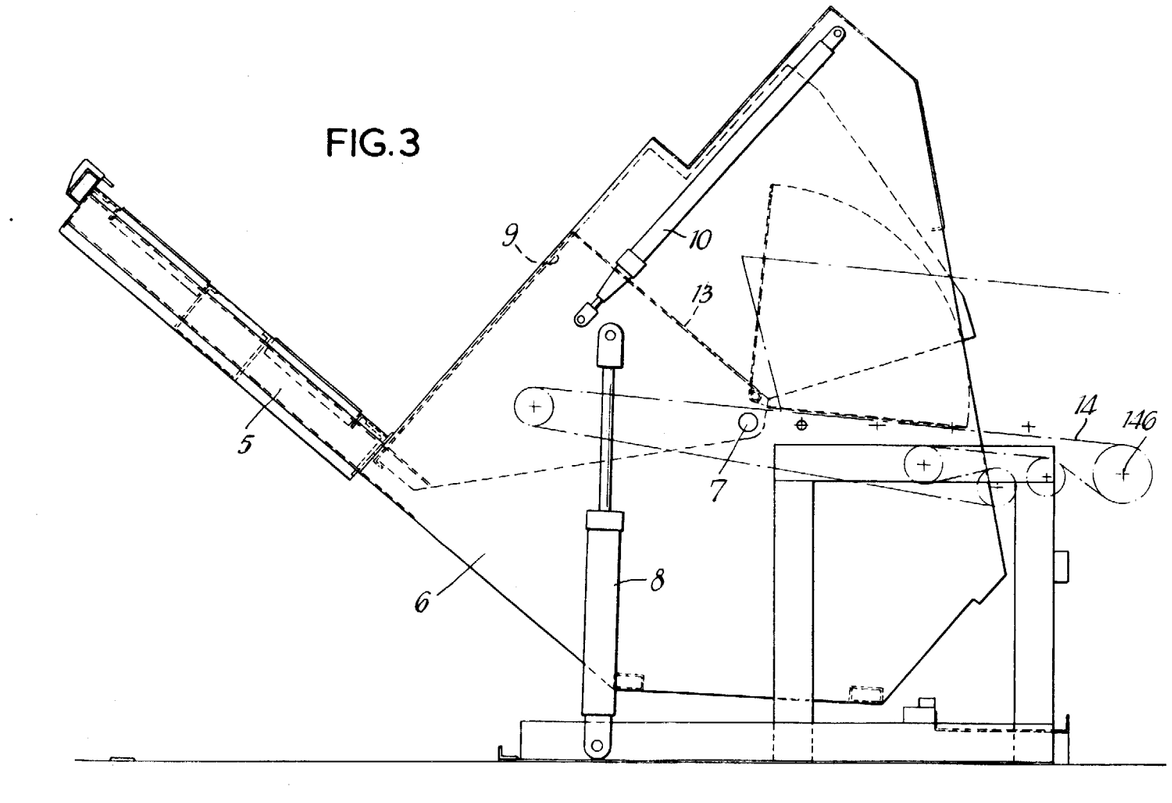
FIGs. 3, 4 and 5 are end elevations of the apparatus shown in FIGS. 1 and 2 in successive stages of unloading, FIGS. 6 and to are views similar to those of FIGS. 1 to 5 of a second embodiment of the invention.

When the container is in position on the cradle 5, it adjoins a fence 9 which initially closes the lower part of the open side of the container until the container and fence have been raised from the upright position shown in FIG. 3 into the tilted position in which the container is to be emptied.

The fence 9 is lowered with respect to the adjacent open side of the container by means of hydraylic or pneumatic jacks 10 which thus permits progressive discharge of successive regions of the container as the fence 9 descends.

FIG. 3 shows a container in position on the decanter cradle 5, before the decanter has been tilted, and with the fence 9 therefore in its relatively uppermost position. Adjoining the upper edge of the fence 9 is a chute 13 which delivers articles released by the fence 9 to a discharge conveyor 14, the tail end of which is supported in slides 15 provided on the fence 9 and which is driven at its head end by a motor 16.

The chute 13 may be constructed entirely of fixed panels. Alternatively the floor of the chute may include a form of conveyor for example a driven belt or band, or a series of parallel rollers which may be driven or idle. This arrangement will reduce or even eliminate friction between the chute and articles leaving the fence on their way to the discharge and distribution points.

The discharge conveyor 14 supplies two delivery conveyors 17 separated by a double plough or watershed 18 which separates the container contents into two streams.

Figure 4:
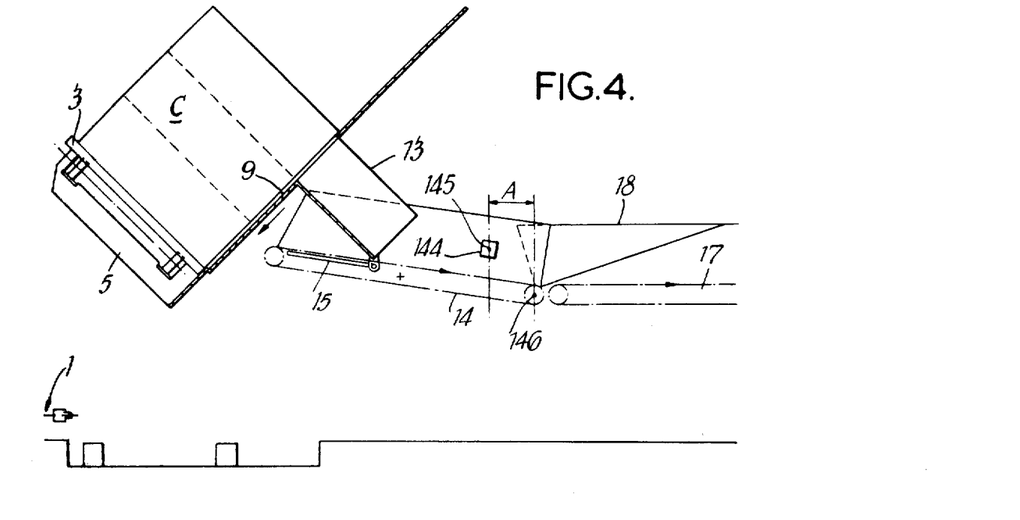

As shown in FIG. 4, the container on its trolley 3 has been lifted and tilted with its open side towards the chute 13 and against the fence 9, while the fence has been aligned with the upper shelf of the container, so that the contents, for example passenger baggage, of the upper compartment have slide down the chute 13 on to the re atively wide discharge conveyor 14 and have been fed to the conveyors 17 for eventual sorting or recovery by the owners. In this connection, the provision of the watershed 18 permits the use of two relatively narrow conveyors, which facilitates changes of direction if desired. It will be evident, however, that the conveyor 14 may be the final discharge, and equally the chute 13 can be arranged to feed articles to a conveyor which runs parallel to the conveyor chain 1 or to feed any other convenient distribution system such as a variable slope carousel.

Figure 1:
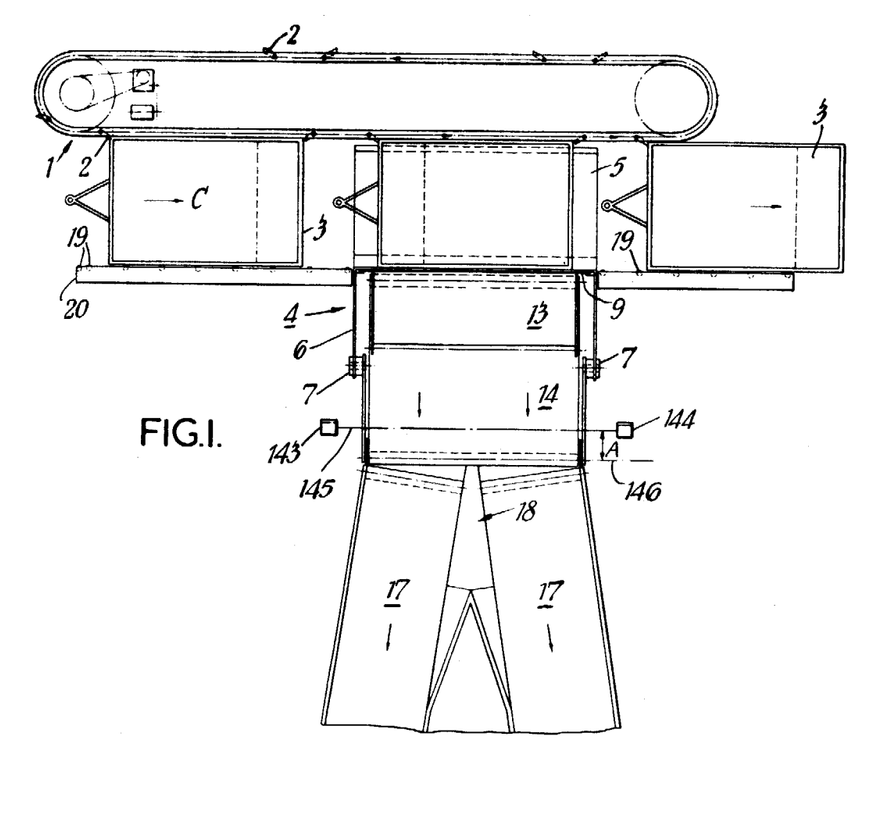
FIGS. 1 and 2 are a plan and side elevation respectively of one form of container unloading apparatus.
Figure 2:
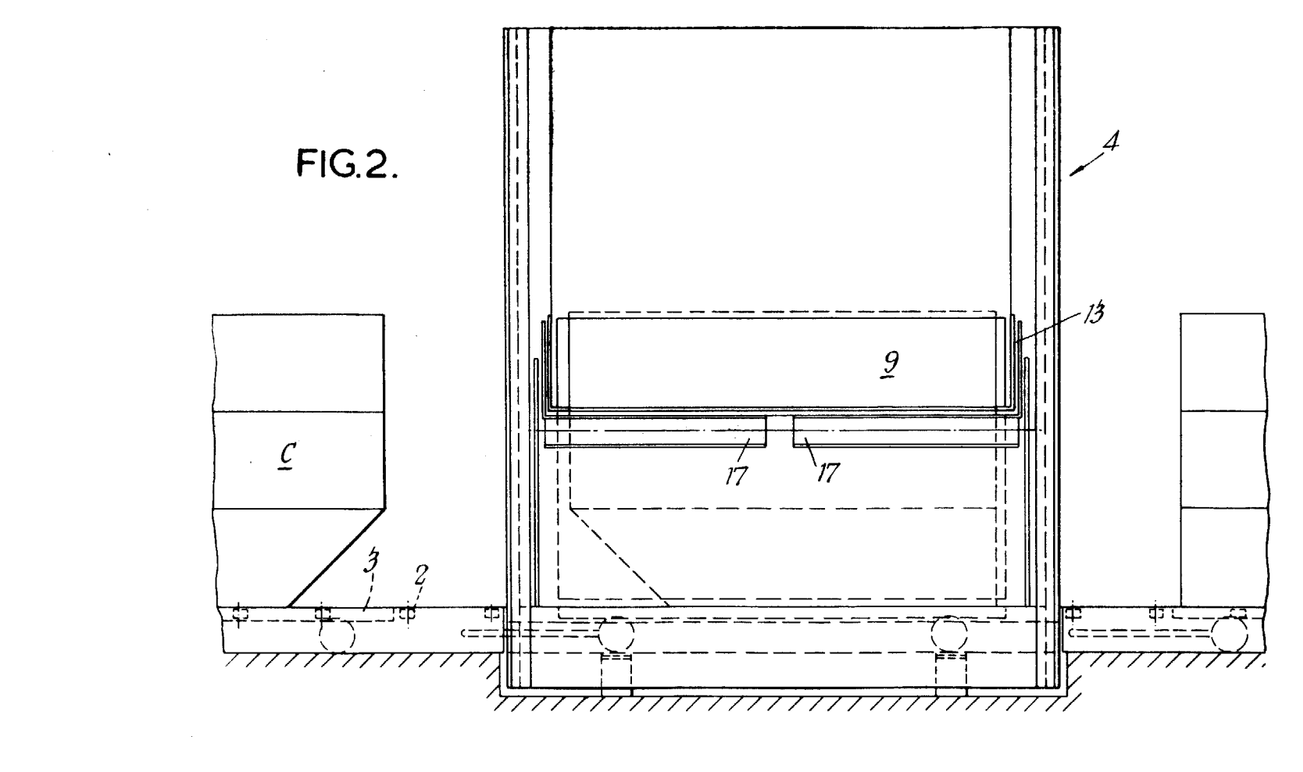

As shown particularly in FIGS. 1 and 4 photo-electric means 143 and 144 are disposed on opposite sides of the conveyor 14 and a beam of light 145 extends across the conveyor 14 between these photo-electric means 143 and 144 at a selected height above the moving surface of conveyor 14. The beam 145 is arranged at a suitable height to be interrupted by the article of least height handled by the apparatus and is spaced from the downstream axis 146 by a distance A corresponding to the length of the article. While the conveyor 14 is empty it runs at its maximum speed driven by motor 16 of FIG. 3 and as soon as an article-leaving the chute 13 breaks the light beam 145, a time delay (not shown) is activated and the conveyor 14 is slowed until both the light beam 145 is freed and the time delay has expired at which time the conveyor 14 will accelerate to its full speed. Thus unless both the beam 145 is made and the time delay has expired, the conveyor 14 will run at its slower speed, so slowing down the rate at which articles are taken from the decanter and fed to the delivery point. Typically the time delay is 1 or 2 seconds.

Figure 5:
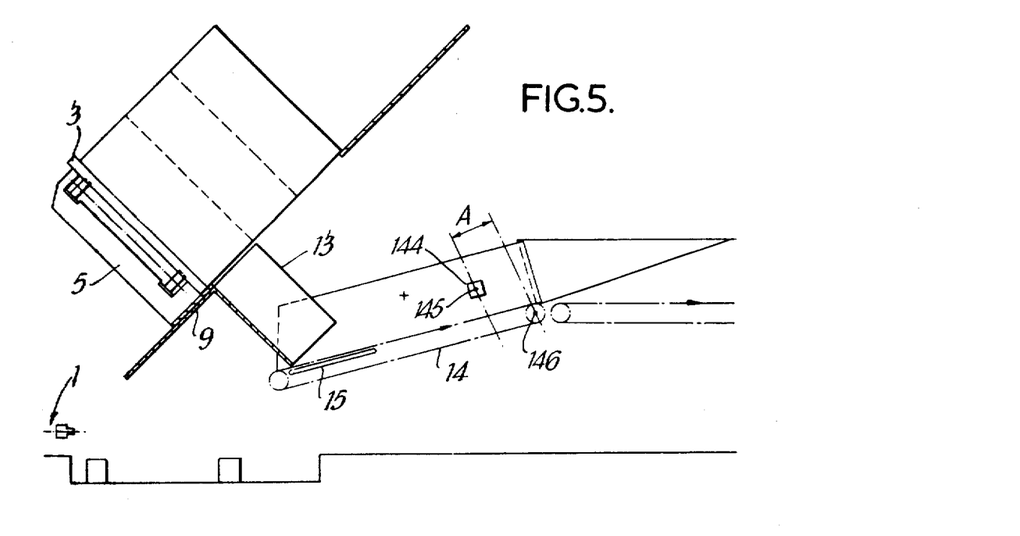

In FIG. 5, the fence 9 is in its lowest position and the bottom compartment is thus emptied. By providing the sliding guides 15 for the conveyor 14 on the fence 9, the conveyor 14 is maintained in alignment with the chute 13, no matter at what height the fence 9 is positioned, so ensuring positive transfer of the container contents from the container to the conveyor 14.

Operation of the hydraulic or pneumatic jacks 10 can be controlled as they effect the relative movement of the fence 9 with respect to the side of the container together with or independently of the changes in speed of the conveyor 14. Thus interruption of the light beam 145 can either completely stop the fence 9 in its relative movement, or the speed of the relative movement can be varied, that is decelerated when the light beam 145 is interrupted. As soon as the light beam 145 is re-established and the time delay has expired, the relative movement of fence 9 with respect to the side of the container is resumed or accelerated as the loading proceeds.

When the container has been emptied, either totally or to a desired degree, it is returned to the position shown in FIG. 3 and the trolley 3 is engaged by the chain drive dogs 2 and driven out of the decanter, the next container and trolley being simultaneously placed on the cradle 5. For controlling the entry and removal of the containers, the trolleys 3 are guided between rollers 19 supported in rails 20.

In the embodiment shown in FIGS. 6 to 10, the container is arranged to be raised with respect to the fence and chute, the fence and chute forming a part of the cradle on which the container is supported during emptying.

Figure 6:
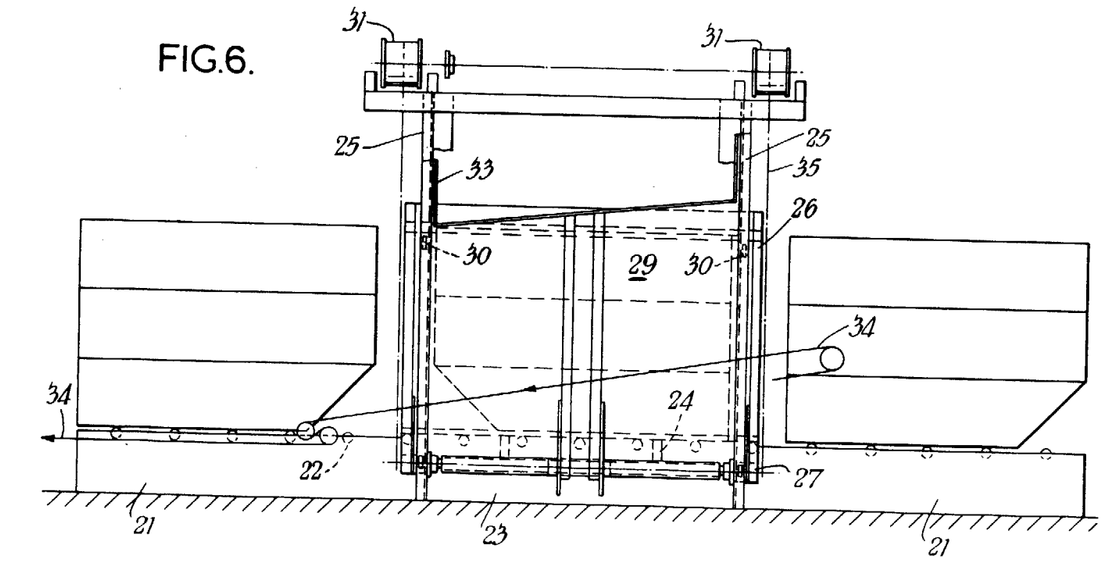

FIG. 6 particularly shows how the edge of the chute 33 may be inclined to provide additional control of the unloading. The incline may be a straight line as shown. Alternatively it may be curved to a greater or less degree, and in a further modification it may be formed in a series of steps, any of these variations enabling greater control over the rate at which articles are discharged from the containers.

Figure 7:
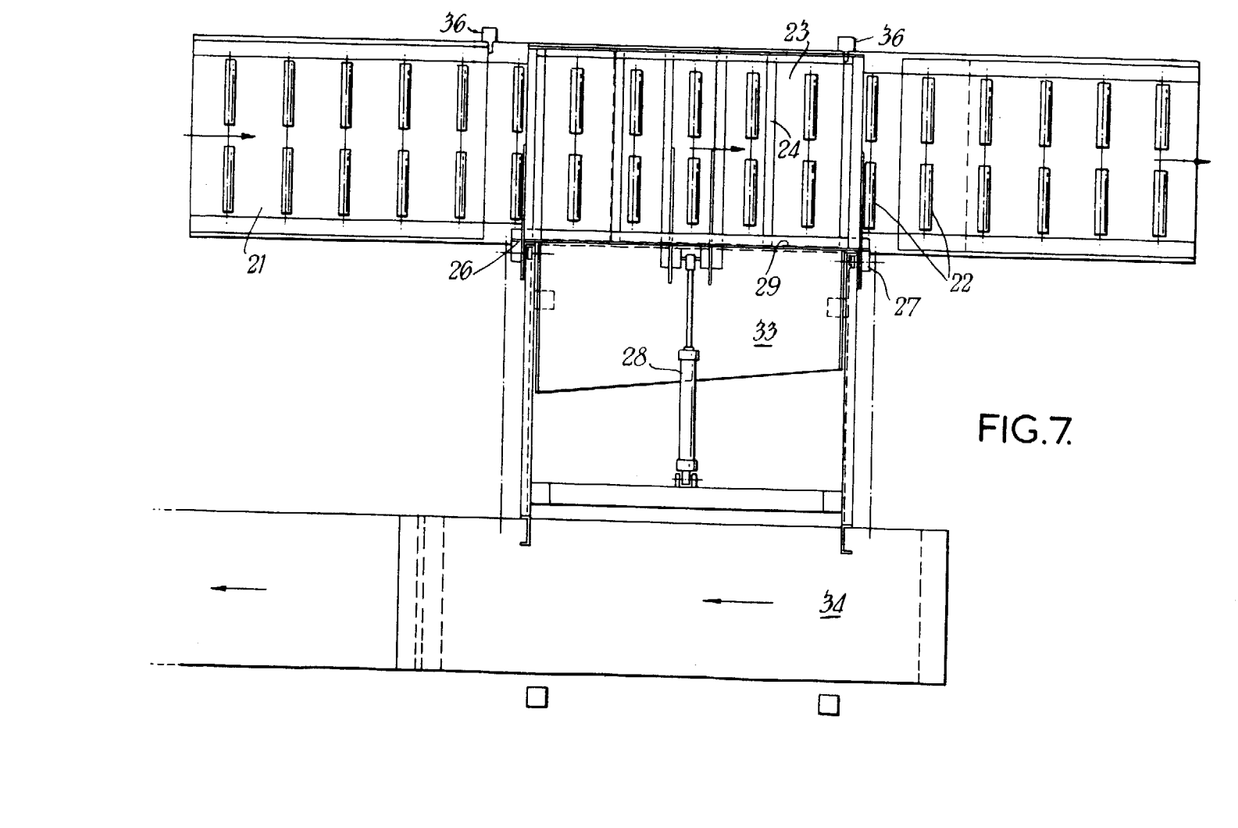
Figure 8:
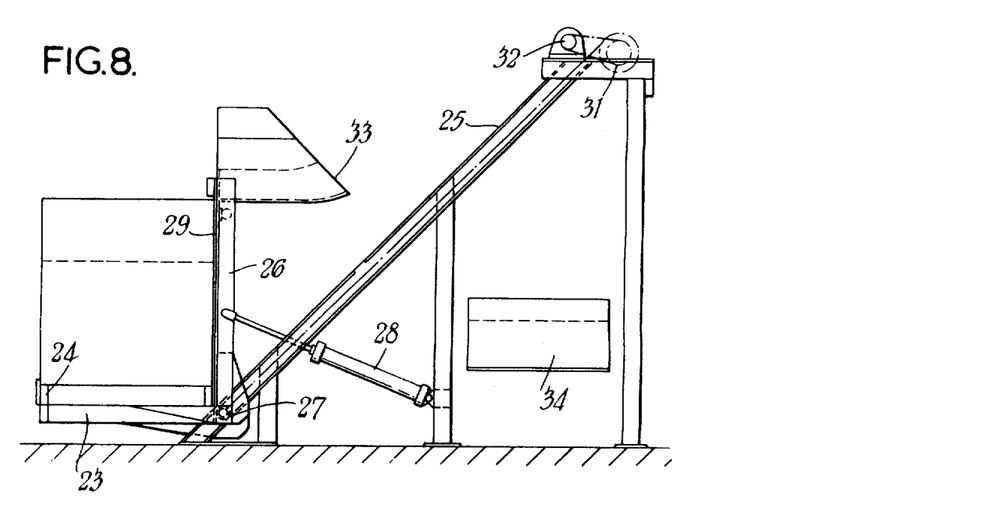
Figure 9:
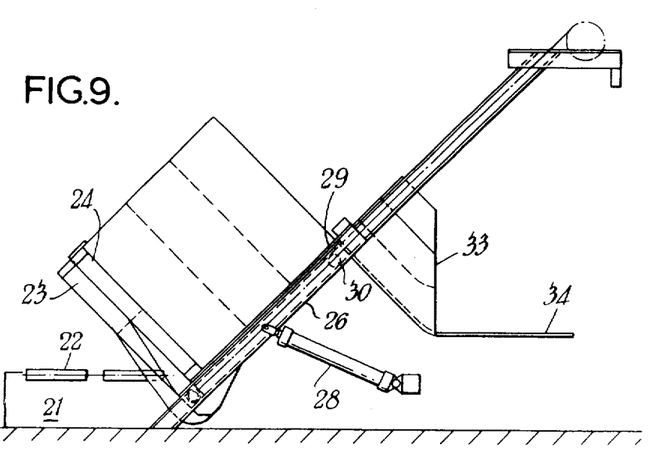
Figure 10:
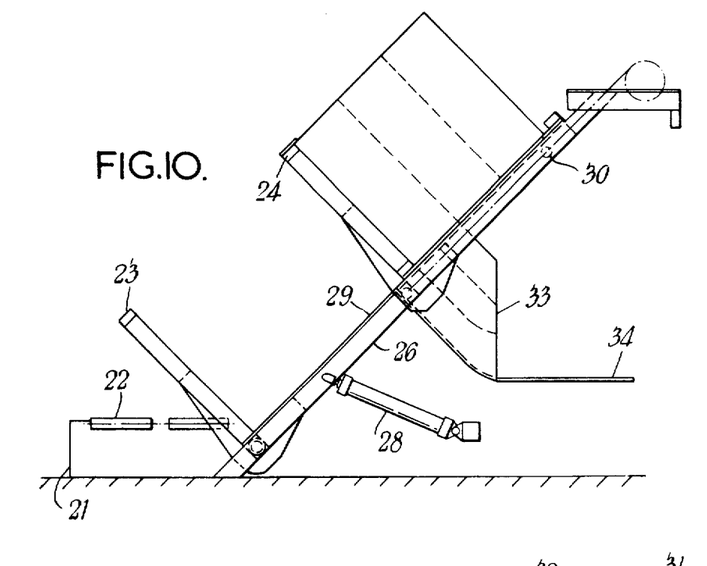
Figure 11:
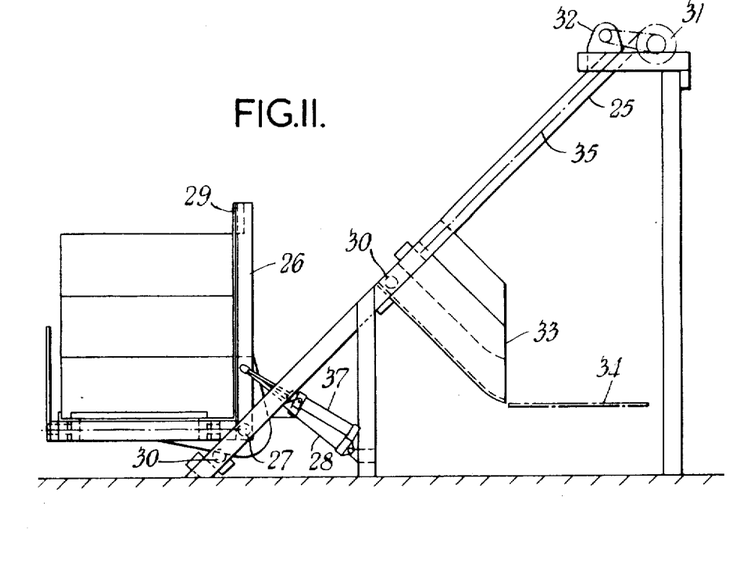
FIGS. 11 to 13 are end elevations similar to those of FIGS. 3 to 5 of a third embodiment of the invention.
Figure 12:
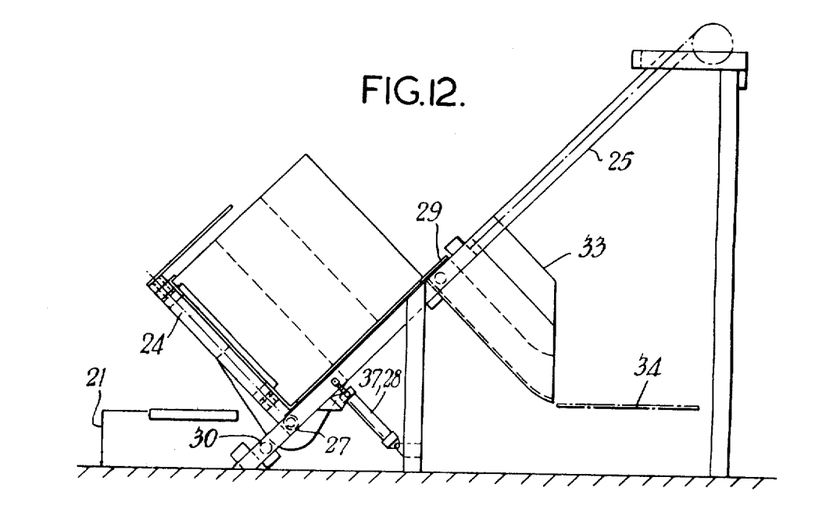
Figure 13:
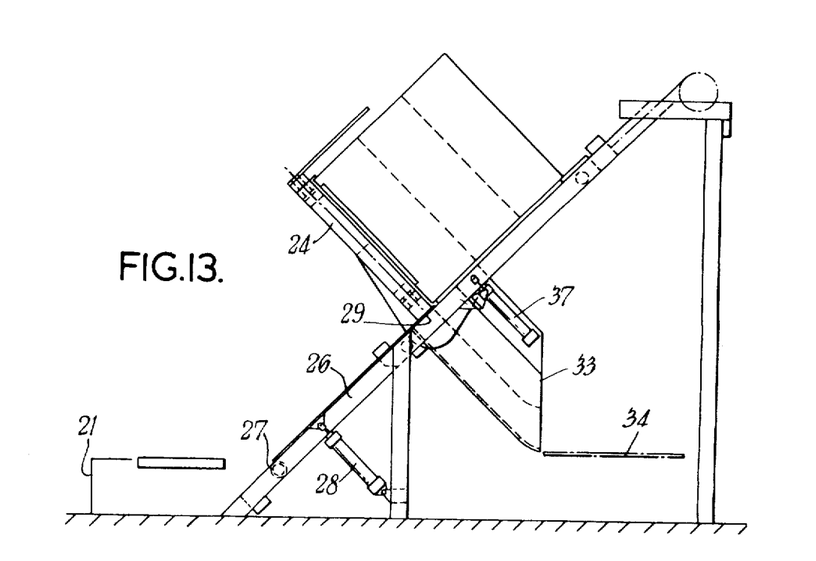

As shown in FIGS. 6 and 7, the container is propelled into and out of the decanter apparatus on powered rollers 22 contained in the entry and exit section of the conveyor 21 and also in the center portion 23 which forms part of the decanter apparatus. Once located on the center portion 23 of the conveyor 21 the full container is supported in a cradle 24 mounted between inclined parallel rails 25. The portion 23 of the conveyor includes a supporting back plate 26 and this back plate, together with the center portion 23 and the cradle 24 are arranged so that they can be tilted about pivots 27 until the back plate 26 is in alignment with the rails 25, this tilting being achieved by means of hydraulic or pneumatic jacks 28. The back plate 26 carries pads which close gaps in the inclined rails 25, and these rails form guide tracks for the container during the emptying operation.

The back plate 26 supports a fence 29 which is aligned with the adjacent open side of the container in the cradle 24, and a chute 33 is also attached thereto, the fence having its upper edge arranged at a shallow angle to the horizontal to give gradual discharge to the container compartment.

When the parts 23 and 24 with the loaded container have been swung to bring the back plate 26 and the inclined rails 25 into alignment, the cradle 24 is supported on rollers 30 which are guided by the rails 25, and the cradle, with the tilted container, are lifted up the inclined rails 25 by means of winches 31 driven by a motor 32, the cradle being connected thereto by cables 35.

Thus the tilted fence 29 and chute 33 remain stationary while the container and cradle 24 slide upwardly past the tilted fence to discharge the container contents on to the chute 33 and thence to a conveyor 34. When the container is empty, it is lowered, on the cradle, until it rests on the center portion 23 of the conveyor, which is the, together with the fence 26 and the chute 33, returned to the upright position shown in FIG. 8, from which the empty container is discharged and a full one loaded into the decanter, these movements being controlled by limit switches 36.

The embodiment illustrated in FIGS. 11 to 14 is similar to that shown in FIGS. 6 to 10, with the difference that the chute 33 is fixed to the decanter in the inclined position and is thus part of the cradle-guiding frame which includes the inclined rails 25. Once the loaded container or the center portion 23 is aligned with the cradle 24 and fence 29 and tilted by means of the jack 28 about the pivots 27, the cradle 24 together with its back plate 26 and the fence 29 are brought into the position in which unloading can commence. The container on its cradle 24 is lifted up the inclined rails 25 by the motor driven winches 31 and the cables 35 while the fence 29 remains stationary and in alignment with the fixed chute 33.

Figure 14:
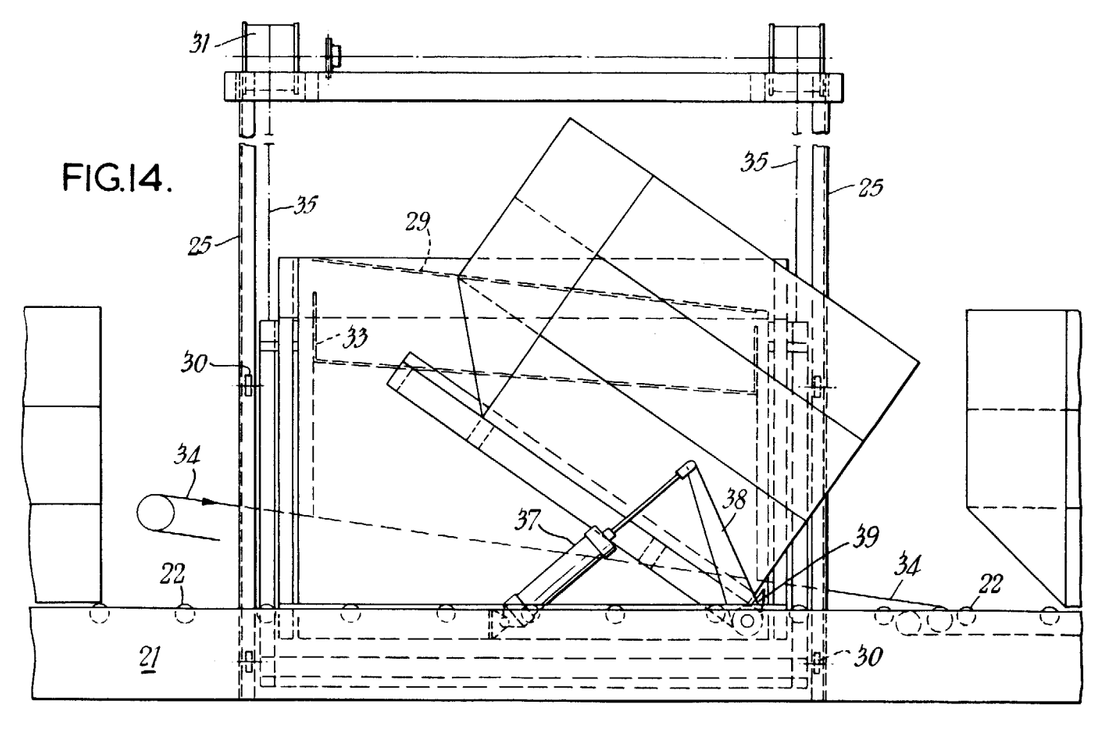
FIG. 14 is a side elevation of the apparatus shown in FIGS. 11 to 13.
Figure 15:
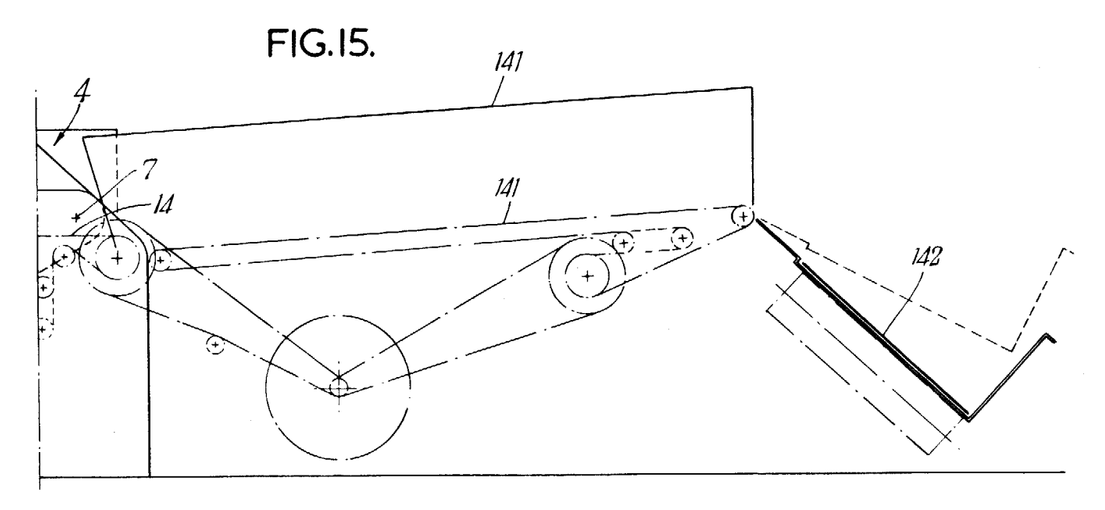
FIG. 15 is a side elevation of an alternative discharge arrangement.

The center portion 23 of the conveyor 1 in this embodiment is also pivotable at one end, transversely with respect to the center line of the conveyor and, as shown in FIG. 14, by means of a jack 37 and a linkage 38, a container can be lifted at one end while it is being moved up the rails 25, which provides more efficient control of the emptying of each part of the container. A spring-loaded back stop 39 is also provided in this embodiment to limit the amount of longitudinal tilting, and to prevent the container from slipping off the cradle 24.

The various embodiments described above, have referred to the emptying of a container through one open side. However, as already stated, a second decanter may be provided for emptying the opposite side of a container, where the container has a central vertical dividing wall in addition to or instead of horizontal shelves.

The conveyors 14 or 34 can lead to any suitable discharge or display and distribution device, such as a variable slope carousel or a suitably controlled sorting arrangement.

Instead of the conveyors 17 or 34, the conveyor 14, as shown in FIG. 5 can be arranged to feed an intermediate conveyor 141 which delivers its load to a take-away conveyor 142 which in this example is a tilted band arranged at right angles to the intermediate conveyor and inclined, for example at 40° thereto. In such an example, the conveyors 14 and 141 may be up to eight feet wide and may have independent or common two-speed drives, while the take-away conveyor 142 may be four feet wide. The conveyor 141 can be operated either as a continuous feeder for the conveyor 142, or it can be operated either as an accumulator or store belt, or in such a way that it evens out the supply of articles to the conveyor 142.

The unloading sequence has typically five stages:

a. the decanter tilts the container with or against the fence.
b. the container contents are discharged under control of the fence.
c. a dwell period allows all the contents to reach the first of the discharge conveyors.
d. the container is returned to the upright position on its conveyor.
e. the container is pushed out of the decanter and a fresh one is fed in to the cradle.

In following these steps, the system operates as the following sequence shows.

Once the container has reached its initial tilted position, the conveyors 14, 17, 34, 141 and 142 start to run at their predetermined speeds. Following this a timer allows the conveyors to run until an article has travelled from the container to the take-away conveyor, this being at a speed which ensures correct article supply to the final conveyor. The conveyors can then be run at a slower speed for the remainder of the unloading cycles. In a particular example, three container shelves 5 feet in width can feed their contents to 20 feet of conveyor running at 120 feet/minute. This means that for example articles can be fed to the conveyor 142 at 320 feet$^2$/minute, and the takeaway conveyor will handle its load at 480 feet$^2$/minute. In such an example baggage can be delivered to the conveyor 142, in a period of 24 seconds, with an indexed separation between the containers of 8 seconds.

The containers may have slidable panels for closing their otherwise open side or sides, the panels on each side being arranged to move vertically and/or horizontally, each side thus preferably having two such panels.

By programming the indexing control for both the vertically and horizontally sliding panels, and starting for example at the upper left-hand corner of a container side, each container can be unloaded part-by-part, and in any chosen sequence, in co-ordination with the relative movement between the tilted container and the adjacent fence.

If the direction of sliding of either or both panels is reversible, then the number of possible unloading sequences is further increased. Thus, if both are reversible, unloading can commence at any of the four corners of the container side. By opening and closing in a chosen order, a practically unlimited number of unloading sequences is available. The particular sequence can be so programmed that each succeeding container can be unloaded in a different sequence.

Loading sequences can be coded for each container at the departure point, once for example the relevant container and flight information is available, and the information can be transmitted by computer link to the or each arrival point on the route, and the computer system will programme the correct identification and unloading sequence of the containers on arrival. By suitably coding containers, and even items within them, the contents may be correctly unloaded and fed even to particular reclamation points or stores, all this being determined before the articles concerned have even left their departure point. Changes due to traffic delay or route alterations can easily be resolved by the computer without serious effect on the optimum unloading operation.

In a modified form of this control of container unloading, each sliding panel is sub-divided into sections each of which can be operated independently.

Thus each sliding panel can be divided horizontally or vertically into a number of individually operable panels, which as in the previous example may be operated in one direction or may be reversible.

All the panels and their sections can be operated by a single drive means working through suitable means, such as clutches, each clutch being engaged only when and for the length of time necessary. The clutches can be energized either individually or in groups of two or more, and obviously all the clutches could be operated simultaneously.

The panels may be vertically and/or horizontally slidable, and this arrangement also makes a large number of unloading sequences possible. There is no need for all the panels or the section to be of equal size, and any combination of panel size is practical. Operation of the panels and their sub sections is controllable by suitable means such as the previously described computer system, or by punched tape or cards. The above handling system permits discrete handling of articles, such as passengers baggage in small quantities for effective traffic control. The passenger may hold a baggage check with container number and subdivision on it, this information being fed to the computer at the departure airport by the checking staff. The computer in turn will produce a claim check for retention by the passage until his arrival.

The above described invention is especially suitable for use in the handling of luggage for aircraft which, particularly in the case of very large, high capacity aircraft, have passengers' luggage, or commercial freight, loaded into containers and stowed in the hold of the aircraft, the containers being mechanically handled and for example color coded to facilitate accurate discharge since speed and efficiency of unloading is of extreme importance in turning round the aircraft, and clearing the incoming passengers and their luggage through the airport with the minimum delay.

We claim:

1. Apparatus for unloading the contents of containers, said apparatus comprising a decanter apparatus provided with means for tilting each container about a horizontal axis towards one side thereof at a discharge station and a fence arranged to hold back the contents of at least one region of said container until the contents of at least one other region of said container have been discharged as a result of said tilting about said axis, each loaded container being supported in the decanter during said tilting towards said side, said fence being provided with controllable means operative to effect relative movement of said fence with respect to said side of said container to provide progressive discharge of the contents of each said region of said container in a predetermined sequence, a discharge chute attached to said fence and a discharge conveyor, the input end of which is in communication with said chute, means being associated with said discharge conveyor to vary the speed of said conveyor between predetermined limits and in response to the presence or absence of the contents of said container on said discharge conveyor, said means for varying the speed of said conveyor being adapted to accelerate said conveyor in the absence of said contents and to decelerate said conveyor in the presence of said contents discharged from said container.

2. Apparatus as claimed in claim 1 wherein said discharge conveyor is carried in an adjustable mounting provided on said chute and arranged to maintain, said input end of said discharge conveyor in continuous communication with said chute throughout the movement of said fence with respect to said open side of said container.

3. Apparatus as claimed in claim 1 wherein said decanter apparatus includes a conveyor means which delivers and discharges said containers to and from said decanter apparatus respectively, a part of said conveyor being arranged to be tilted with said container.

4. Apparatus as claimed in claim 1 wherein the means which vary the speed of said discharge conveyor comprise photo-electric means which generate a beam of light extending transversely across said discharge conveyor at a predetermined height above the load conveying surface thereof and at a predetermined distance from the discharge end of said discharge conveyor, said height and said distance being determined in dependence on the dimensions of the contents of the container.

5. Apparatus as claimed in claim 1 wherein the controllable means operative to effect said relative movement of said fence with respect to said side of said container is controlled in synchronism with the means associated with said discharge conveyor to vary the speed of said discharge conveyor, said controllable means being operative to vary the rate of said relative movement of said fence in dependence on the presence or absence of said container contents of said discharge conveyor between a predetermined maximum and a station condition.

6. Apparatus as claimed in claim 2 wherein the discharge conveyor receives the contents from each said region of said container from said chute and delivers said articles to a delivery conveyor arranged at right angles to said intermediate conveyor, each of said conveyors being provided with controllable driving means, said delivery conveyor being transversely inclined at least at the point where it is fed by the preceding conveyor.

7. Apparatus as claimed in claim 2 wherein the discharge conveyor receives the contents from each said region of said container from said chute and delivers said articles to an intermediate conveyor, said intermediate conveyor being arranged to deliver said articles to a delivery conveyor arranged at right angles to said intermediate conveyor, each of said conveyors being provided with controllable driving means, said delivery conveyor being transversely inclined at least at the point where it is fed by the preceding conveyor.

8. Apparatus as claimed in claim 1 wherein said decanter apparatus is provided with tilting means operable to tilt a container in said apparatus about a second horizontal axis which is perpendicular to the axis about which said container is tilted towards one side thereof.

9. Apparatus as claimed in claim 1 wherein the edge of the fence is inclined such that one end thereof against the container side is lower than the other end.

10. Apparatus as claimed in claim 9 wherein the edge of said fence is a series of steps.

11. Apparatus as claimed in claim 2 wherein said discharge conveyor conveys its contents to a pair of conveyors the combined width of which is equal to the width of the discharge conveyor, said pair of conveyors being separated by a double plough or water shed.

* * * * *

PO-1050
(5/69)

UNITED STATES PATENT OFFICE
CERTIFICATE OF CORRECTION

Patent No. 3,717,270          Dated February 20, 1973

Inventor(s) SYDNEY WILLIAM ROOKE and RONALD FRANCES COSTON

It is certified that error appears in the above-identified patent and that said Letters Patent are hereby corrected as shown below:

The name of the assignee shown on the
Patent as "Sonex Ltd., Kent, England"
should be "Sovex Ltd., Kent, England"

Signed and sealed this 17th day of September 1974.

(SEAL)
Attest:

McCOY M. GIBSON JR.                    C. MARSHALL DANN
Attesting Officer                      Commissioner of Patents